(12) United States Patent
Hammerschmidt

(10) Patent No.: US 8,184,013 B2
(45) Date of Patent: May 22, 2012

(54) CAPACITIVE DETECTION SYSTEMS AND METHODS

(75) Inventor: Dirk Hammerschmidt, Villach (AT)

(73) Assignee: Infineon Technologies, AG, Neubiberg (DE)

( * ) Notice: Subject to any disclaimer, the term of this patent is extended or adjusted under 35 U.S.C. 154(b) by 912 days.

(21) Appl. No.: 12/204,820

(22) Filed: Sep. 5, 2008

(65) Prior Publication Data

US 2010/0060471 A1   Mar. 11, 2010

(51) Int. Cl.
G08B 13/00 (2006.01)
G08B 23/00 (2006.01)
G08B 21/00 (2006.01)
B60R 21/16 (2006.01)
B60R 21/26 (2011.01)
B60R 22/00 (2006.01)
E05F 15/00 (2006.01)
G05D 3/00 (2006.01)

(52) U.S. Cl. ............ 340/667; 340/573.1; 340/562; 701/45; 280/734; 280/735; 280/736

(58) Field of Classification Search ............... 340/667, 340/573.1, 562; 701/45; 280/734, 735, 736
See application file for complete search history.

(56) References Cited

U.S. PATENT DOCUMENTS

| | | | |
|---|---|---|---|
| 6,563,231 B1 * | 5/2003 | Stanley et al. | 307/10.1 |
| 2001/0013697 A1 * | 8/2001 | Saito et al. | 280/735 |
| 2003/0151239 A1 * | 8/2003 | Murphy | 280/735 |
| 2004/0100283 A1 * | 5/2004 | Meyer et al. | 324/662 |
| 2005/0121885 A1 * | 6/2005 | Shieh | 280/730.1 |
| 2006/0196276 A1 * | 9/2006 | Fortune et al. | 73/780 |
| 2007/0132559 A1 * | 6/2007 | Schleeh | 340/425.5 |
| 2008/0147278 A1 * | 6/2008 | Breed | 701/45 |

FOREIGN PATENT DOCUMENTS

| | | |
|---|---|---|
| DE | 196 30 769 A1 | 2/1998 |
| DE | 695 02 091 T2 | 10/1998 |
| DE | 102 35 881 A1 | 2/2004 |
| DE | 10 2005 057 807 A1 | 6/2007 |

* cited by examiner

*Primary Examiner* — Brent Swarthout
*Assistant Examiner* — Andrew Bee
(74) *Attorney, Agent, or Firm* — Patterson Thuente Christensen Pedersen, P.A.

(57) ABSTRACT

The invention is related to capacitive detection systems and methods. In one embodiment, a capacitive detection system comprises a first transmitter electrode and a first receiver electrode disposed in a first seat and configured to form a first capacitor, and a second transmitter electrode disposed in a second seat and configured with the first receiver electrode to form a second capacitor.

19 Claims, 6 Drawing Sheets

FIG. 10A    FIG. 10B and position detection. Various arrangements of the electrodes of such sensors create an electric field between the electrodes. As the electric field changes, a corresponding current change can be measured, and from the relationship between current and voltage the parameters of a coupling network between the electrodes can be determined.

CAPACITIVE DETECTION SYSTEMS AND METHODS

BACKGROUND OF THE INVENTION

Capacitive sensors can be used for distance measurement and position detection. Various arrangements of the electrodes of such sensors create an electric field between the electrodes. As the electric field changes, a corresponding current change can be measured, and from the relationship between current and voltage the parameters of a coupling network between the electrodes can be determined.

An object that is brought or moves into the field between the electrodes can alter the properties of the field in a variety of ways. For example, the object can increase the coupling by coupling via a higher permittivity. The object can also increase the coupling by electrical conductance. Additionally, the object can decrease the coupling by causing a surge of part of the field to ground.

Using multiple electrodes, a kind of electrical tomography of the space in front of the electrodes can be produced. This sensing principle is currently well-known for the realization of seat occupant sensors for the front passenger seat of a vehicle. Such systems use a certain number of electrodes to generate an electrical field and at least one electrode to measure the electrical field generated by the other electrodes. Given the number of electrodes needed to implement these systems, the complexity and cost are relatively high. Additionally, the hardware needed to interface the electrodes with an electronic control unit (ECU) is a significant part of the system cost. Thus, extending a system for the three back seats of a vehicle using the same technology as for the front passenger seat could increase the overall system price, not to mention the complexity, by a factor of four or more, which is undesirable.

SUMMARY OF THE INVENTION

The invention is related to capacitive detection systems and methods. In one embodiment, a capacitive detection system comprises a first transmitter electrode and a first receiver electrode disposed in a first seat and configured to form a first capacitor, and a second transmitter electrode disposed in a second seat and configured with the first receiver electrode to form a second capacitor.

In another embodiment, a vehicle seat occupancy detection system comprises a first transmitter electrode capacitively coupled to a first receiver electrode, the first transmitter electrode and the first receiver electrode arranged in a first vehicle front seat; a second transmitter electrode capacitively coupled to a second receiver electrode, the second transmitter electrode and the second receiver electrode arranged in a second vehicle front seat; a third transmitter electrode capacitively coupled to the first receiver electrode and arranged in a vehicle backseat; a fourth transmitter electrode capacitively coupled to the second receiver electrode and arranged in the vehicle backseat; and a fifth transmitter electrode capacitively coupled to the first and second receiver electrodes and arranged in the vehicle backseat.

In yet another embodiment, a method of determining an occupancy status comprises sensing a first capacitance between a first electrode in a first seat and a second electrode in a second seat, and determining an occupancy status of at least a portion of the second seat based on the first capacitance.

BRIEF DESCRIPTION OF THE DRAWINGS

The invention may be more completely understood from the following detailed description of various embodiments in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Figure 1:
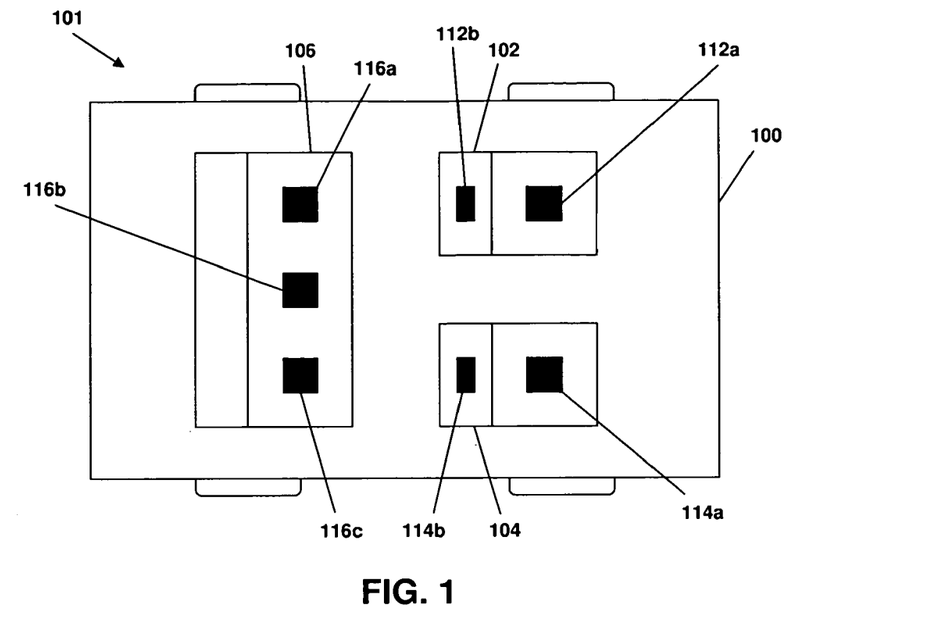
FIG. 1 is a diagram of a vehicle according to an embodiment.

The invention is related to capacitive sensing systems and methods. In various embodiments, the invention relates to backseat occupant detection systems and methods. Embodiments of the invention can reduce the electrodes and electronics needed to implement such detection systems and methods in the backseat while also eliminating the need to interface the backseat components with an electronics control unit (ECU), thereby reducing system costs and complexity. The invention can be more readily understood by reference to FIGS. 1-10B and the following description. While the invention is not necessarily limited to the specifically depicted application(s), the invention will be better appreciated using a discussion of exemplary embodiments in specific contexts. Referring to FIG. 1, a vehicle 100 is depicted. Vehicle 100 can comprise a car, truck, van, minivan, station wagon, or virtually any passenger or other automobile in various embodiments. In the embodiment depicted, vehicle 100 includes a driver seat 102, a front passenger seat 104, and a back seat 106. Although the left-hand front seat (102) is referred to herein for convenience as the driver seat and the right-hand front seat (104) as the passenger seat in accordance with a left-hand drive vehicle, seats 102 and 104 can also be reversed in accordance with a right-hand drive vehicle, and the actual configuration has little or no bearing on the invention itself. Backseat 106 is configured in one embodiment to seat three across a single bench-type seat, although other seat types and configurations can exist in other embodiments.

An embodiment of an occupant detection system 101 is implemented in vehicle 100. Occupant detection system 101 comprises electrodes 112a and 112b in seat 102 and electrodes 114a and 114b in seat 104 in one embodiment. In other embodiments, more or fewer electrodes can be positioned in either or each front seat 102 and 104 as part of system 101. Electrodes 112a and 114a are configured as transmitter electrodes and disposed in a bottom portion of seats 102 and 104, respectively, while electrodes 112b and 114b are configured as receiver electrodes and are respectively positioned in a rear or back portion of each of seats 102 and 104 in one embodiment. In one embodiment, for example, electrodes 112b and 114b are disposed toward the back of the bottom portion of seats 102 and 104, respectively. In another embodiment, electrodes 112b and 114b are disposed in a backrest portion of seats 102 and 104, respectively. In yet another embodiment, electrodes 112b and 114b are disposed partially in each of the bottom and backrest portions of seats 102 and 104, respectively.

Backseat 106 comprises three electrodes 116a, 116b and 116c in one embodiment of system 101. Electrodes 116a, 116b and 116c are configured as transmitter electrodes in one embodiment, disposed in a bottom portion of seat 106. Electrodes 116a, 116b and 116c are spaced apart from each other and generally aligned with individual passenger seating areas along backseat 106. Backseat 106 can comprise more or fewer electrodes in other embodiments. For example, in an embodiment in which backseat 106 comprises two distinct "bucket" seats, each individual backseat can comprise a transmitter electrode disposed in a bottom portion of the seat.

In the embodiment of FIG. 1, electrodes 112b and 114b are configured as receiver electrodes for both front seat electrodes 112a and 114a and backseat electrodes 116a-c. In such an embodiment, each transmitter electrode 112a, 114a and 116a-c can modulate its respective voltage against a ground potential. A coupling capacitance exists between receive and transmit electrodes, as the various pairs or sets of electrodes are configured to form capacitor structures. According to an embodiment of the invention, a plurality of varying electrode pairs can be formed between and within front seats 102 and 104 and backseat 106. A change in the coupling capacitance, or electric field, between an electrode pair can be detected and measured by the receiver electrode through a resulting current shift.

Such a change in coupling capacitance can be caused by a person seated or positioned between a pair of transmit and receive electrodes. A person's body can be assumed to have a high conductivity. This is generally true regardless of the size, height, weight or other physical characteristics of a particular person. Further, it is also generally applicable to babies and small children occupying safety seats. Thus, a person seated above one of the transmit electrodes 112a, 114a, 116a-c picks up a transmitted potential via a coupling capacitance between the transmit electrode and the person. If the person also comes close to a receive electrode 112b or 114b, the signal picked up from a corresponding transmit electrode is received via a second coupling capacitor that is formed between the person's body and the corresponding receive electrode 112b or 114b.

Figure 2:
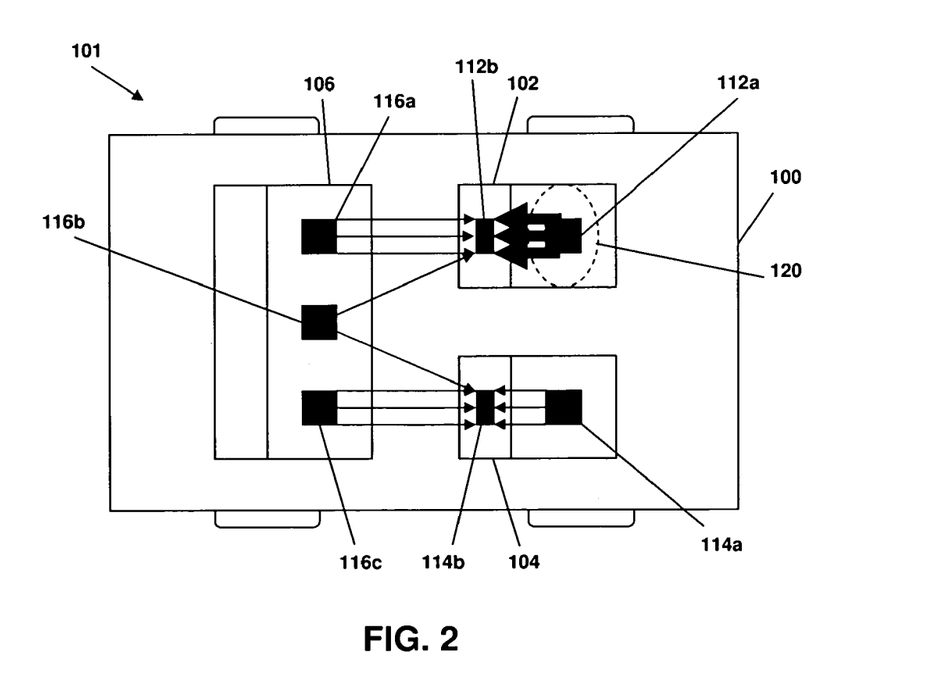
FIG. 2 is a diagram of a vehicle according to an embodiment.
Figure 3:
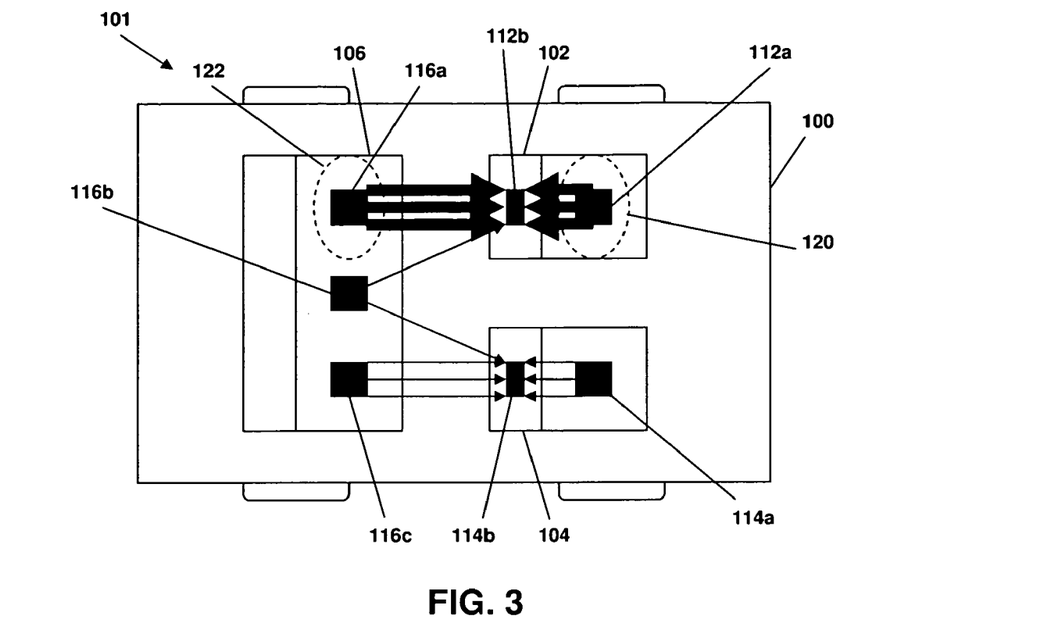
FIG. 3 is a diagram of a vehicle according to an embodiment.

For example, in FIG. 2, a person 120 is seated in front seat 112. A signal transmitted by transmit electrode 112a is received by receive electrode 112b via the highly conductive body of person 120, and the signal has a relatively strong field strength. Conversely, a signal transmitted by transmit electrode 114a results in a weaker field strength signal received at receive electrode 114b because the signal travels through the less conductive air. Similarly, if backseat 106 is not occupied, receive electrodes 112b and 114b will receive a relatively weak field strength signal from backseat transmit electrodes 116a-c because of the longer distance, through air, separating receive electrodes 112b and 114b from transmit electrodes 116a-c.

Figure 4:
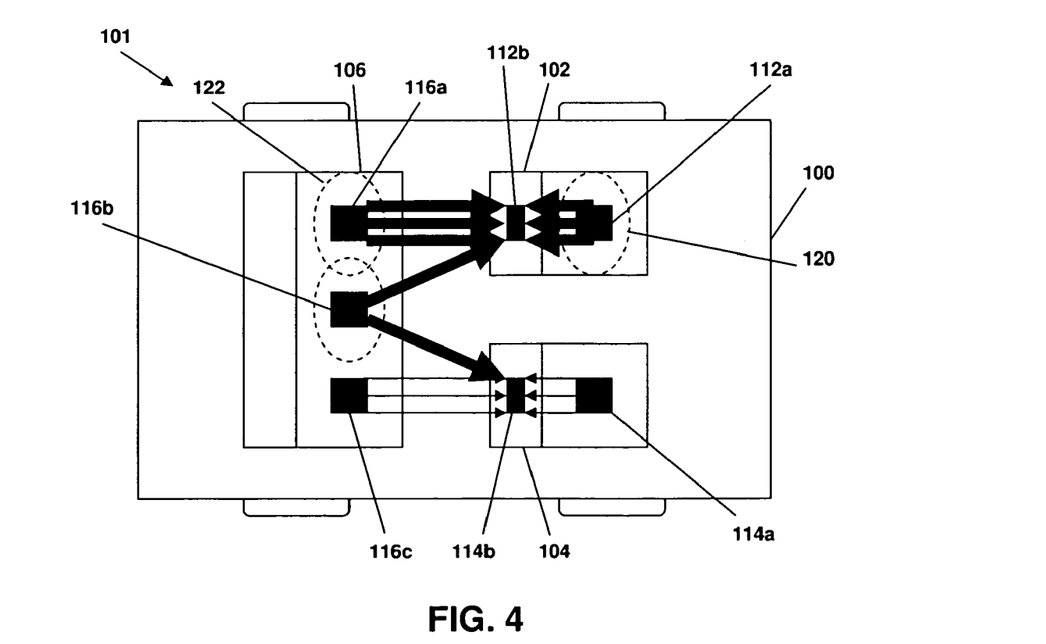
FIG. 4 is a diagram of a vehicle according to an embodiment.

If part of backseat 106 is occupied, however, a stronger signal will be received by one or both of receive electrodes 112b and 114b. For example, in FIG. 3, backseat 106 is occupied behind front seat 112 by a person 122. Much of the distance between electrodes 106a and 112b is bridged by the body of person 112, and receive electrode 112b thus receives a stronger electrical field signal. If the middle portion of backseat 106 is occupied, as is depicted in FIG. 4, both front seats 102 and 104 can detect a significantly increased coupling.

Figure 5:
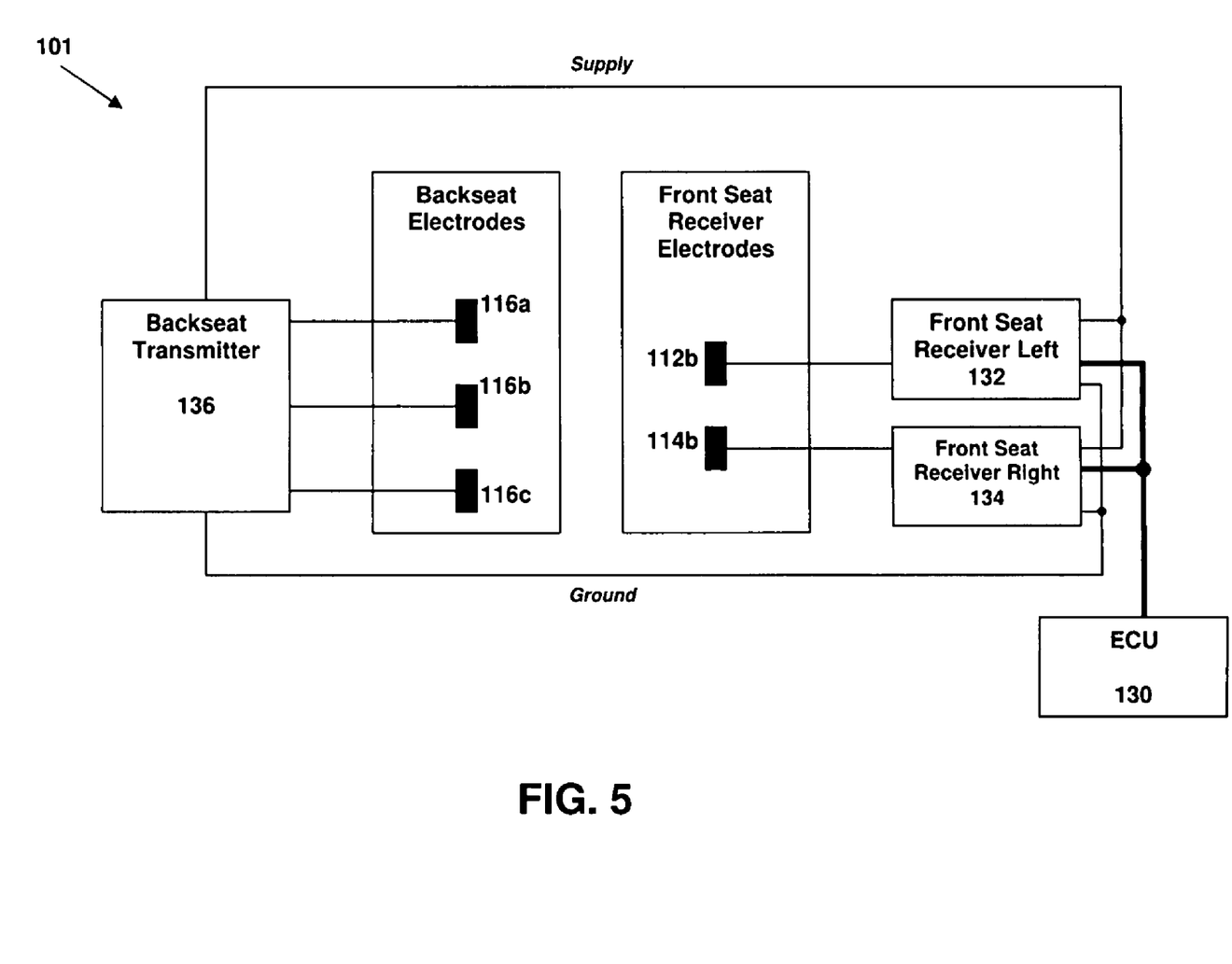
FIG. 5 is a block diagram according to an embodiment.

In one embodiment, and referring to FIG. 5, system 101 further comprises an electronics control unit (ECU) 130. ECU 130 is coupled to a first receiver unit 132, which is coupled to electrode 112b, and to a second receiver unit 134, which is coupled to electrode 114b. In one embodiment, ECU 130 is coupled to receiver units 132 and 134 by a bus. Although not depicted in FIG. 5, ECU 130 is also coupled to transmitter electrodes 112a and 114a in one embodiment. In another embodiment, system 101 can comprise a plurality of ECUs.

Backseat electrodes 116a-c are in turn coupled to a backseat transmitter unit 136. Transmitter unit 136 initiates and controls, at least in part, the signals sent to and via electrodes 116a-c. Transmitter unit 136 is also coupled to receiver units 132 and 134 by a supply line and ground.

In one embodiment, ECU 130 is configured to receive signals or otherwise collect data from electrodes 112b and 114b via receiver units 132 and 134. ECU 130 can analyze the signals and/or data to determine coupling patterns between the various transmit and receive electrodes, and to determine seat occupancy therefrom. In an embodiment in which electrodes 112a, 112b, 114a and 114b are all coupled to ECU 130, signals from front transmitter electrodes 112a and 112b can be isolated by synchronous demodulation techniques. Backseat transmitter 136 and electrodes 116a-c are not connected to the front seat electronics in one embodiment and use fixed transmission schemes which can be detected by scanning known transmission channels.

In various embodiments, additional measures can be taken to avoid distortion of measurements due to interference between front transmitter electrodes 112a and 114a and backseat transmitter electrodes 116a-c. In one embodiment, an avoidance technique is based on multiple channel access principles and methods often used in radio frequency (RF) transmissions.

For example, a time division multiple access (TDMA) technique is used in one embodiment. TDMA permits sharing of a single frequency channel by dividing signals into different time slots. According to a TDMA technique, backseat transmitter 136 can transmit via transmitter electrodes 116a-c in a defined time raster. If front seat receiver units 132 and 134 detect those transmissions, front seat receiver units 132 and 134 can reschedule their own measurements to fit into the gaps between backseat transmissions. Time limits for backseat occupant detection are therefore long, and more complex front seat systems and components can gather more detailed information about the position of their occupants by using multiple different, spatially arranged electrodes. Scheduling will typically be asymmetrical, with the backseat slots shorter than the front seat slots.

In another embodiment, a frequency division multiple access (FDMA) technique can be used. FDMA allocates particular individual frequencies for each communications signal in a band. According to one embodiment, backseat (136)

and front seat (not shown) transmitters have different frequencies to select from, and receivers 132 and 134 can tune either to the known front seat transmitter frequency (synchronous operation) or check for received signals on the channel(s) allocated for the backseat.

In yet another embodiment, a code division multiple access (CDMA) technique can be used. In simple terms, CDMA uses different codes which are shared to identify communication partners. Thus, in one embodiment, backseat transmitter 136 and the front seat transmitter (not shown) use different orthogonal code sequences to modulate their respective fields. Receivers 132 and 134 use the same codes for demodulation. Thus, orthogonality ensures that demodulation of one channel does not detect signals from the other, and both channels can operate simultaneously. In one embodiment, the front seat channel operates synchronously and knows which pattern is used, while the backseat channel scans all available backseat patterns and synchronizes if a signal is found.

Figure 6:
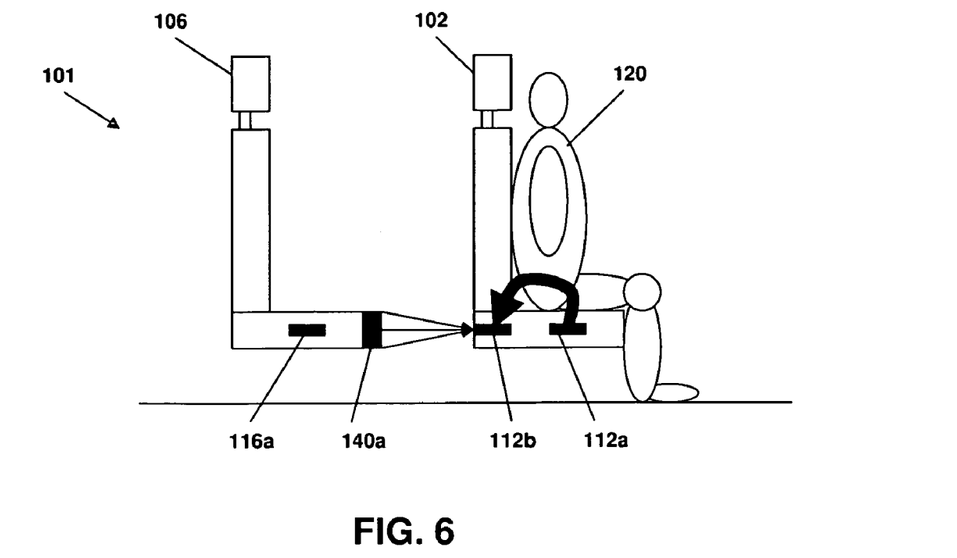
FIG. 6 is a diagram of a seating arrangement according to an embodiment.
Figure 7:
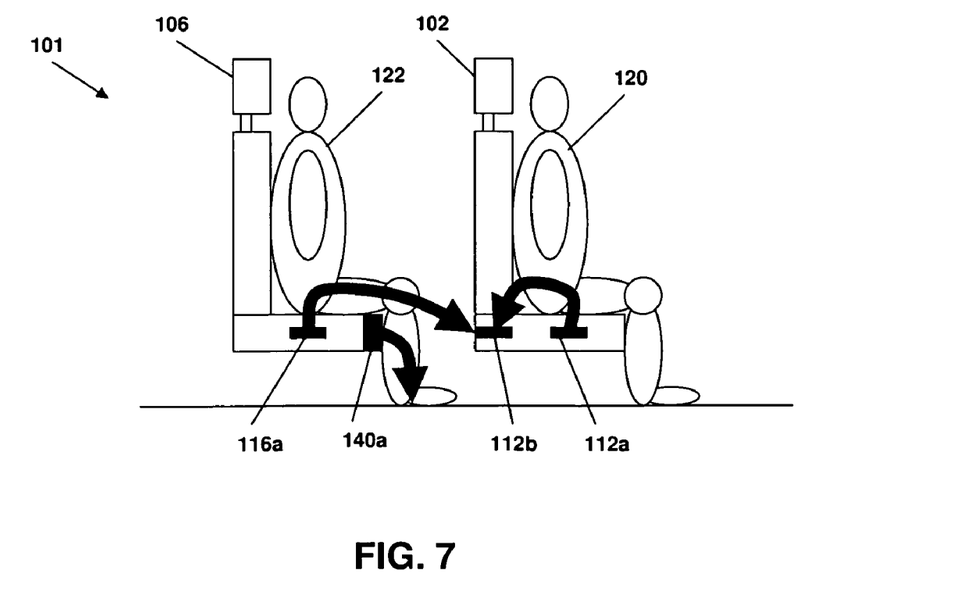
FIG. 7 is a diagram of a seating arrangement according to an embodiment.

Referring to FIGS. 6 and 7, another embodiment of system 101 is depicted and comprises an additional electrode 140a mounted in backseat 106. In one embodiment, backseat 106 comprises three of electrodes 140a, one associated with each seating area. In another embodiment, backseat 106 comprises more or fewer electrodes 140a. Each electrode 140a is generally disposed in a forward part of the seat portion of backseat 106, nearest front seat 102. In other embodiments, electrode 140a is positioned in another part of backseat 106 and/or the position of electrode 140a varies according to whether it is associated with a leftmost, rightmost or center seating area. In general, however, electrode 140a is disposed nearer to front seat 102 and receiver electrode 112b than backseat electrode 116a. Electrode 140a is also positioned or sized such that a larger area is exposed toward receiver electrode 112b.

Such a configuration and disposition of electrode 140a enables addition of a second communication channel between backseat 106 and front seat 102 in one embodiment. An advantage of such a channel is its visibility even if there is no occupant on the portion of backseat 106 associated with electrode 140a. Electrode 140a thereby provides a way in which backseat transmitter 136 can be tested for functionality and operability, which may not otherwise be possible from front seat 102 given the distance between backseat transmitter electrode 116a and receiver electrode 112b. Such a distance does not facilitate transmission of a sufficiently strong electric field for detection at front seat receiver electrode 112b without an occupant on backseat 106.

For example, as depicted FIG. 6, an electrical field signal is transmitted from front seat transmitter electrode 112a to receiver electrode 112b via the body 120 of a seat occupant. In contrast, the signal from backseat electrode 116a is too weak to reach receiver electrode 112b. When no signal is received, it could be because that portion of backseat 106 is unoccupied or because there is a malfunction of a component of system 101. Thus, the opportunity to test or check the components of system 101 could be desired. As shown in FIG. 6, a stronger signal is transmitted from electrode 140a to electrode 112b given their closer proximity.

FIG. 7 depicts a situation in which backseat 106 is occupied. When backseat 106 is occupied in the region of electrode 140a, a stronger signal is transmitted to receiver electrode 112b via the body 122 of the seat occupant. The signal transmitted by electrode 140a is then mostly sent to ground, with the shielding effect of electrode 140a expected to be dominant.

Figure 8:
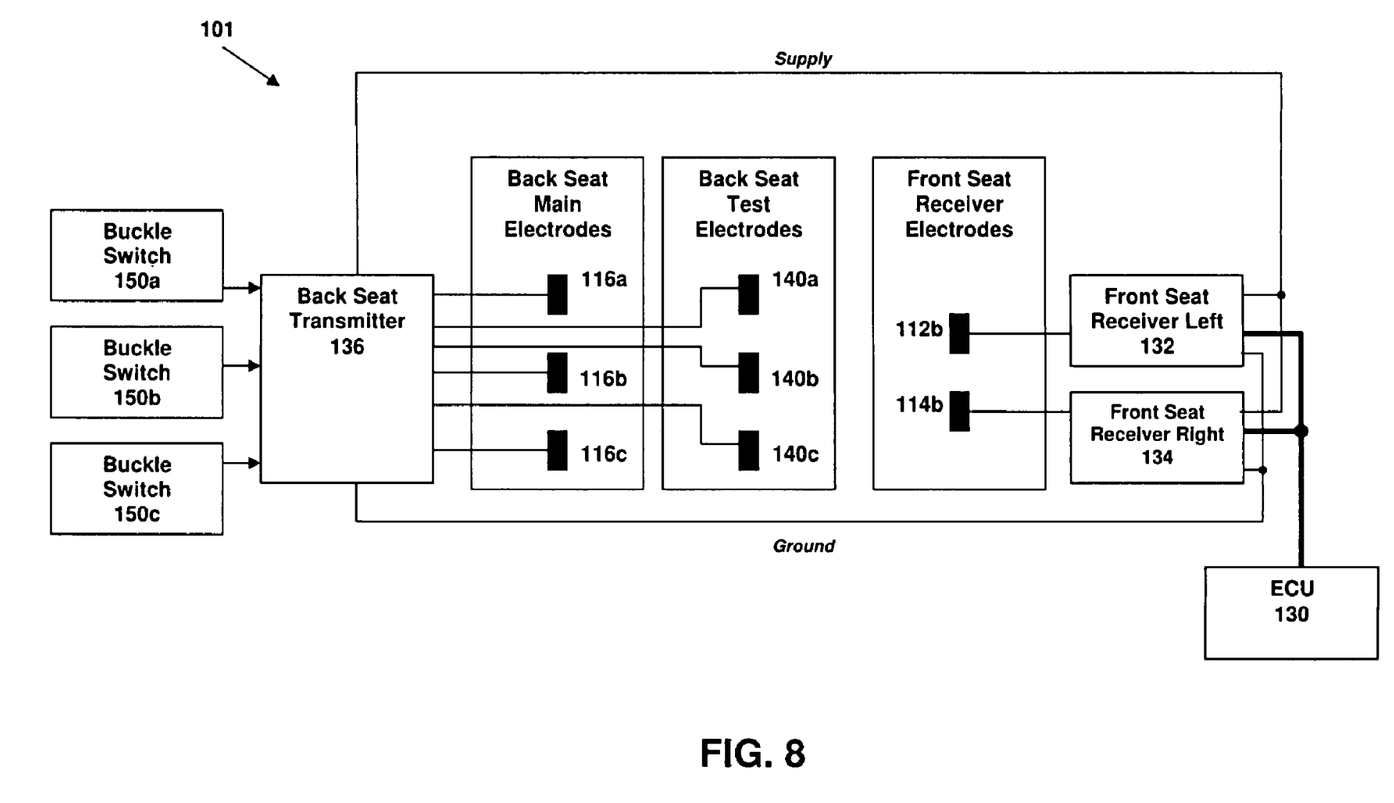
FIG. 8 is a block diagram according to an embodiment.

FIG. 8 is a block diagram of system 101 and includes electrode 140a coupled to backseat transmitter 136. Electrodes 140b and 140c are also depicted, in accordance with an embodiment in which backseat 106 provides seating for three occupants. System 101 can also optionally include buckle switches 150a, 150b and 150c. Buckle switches 150a-c can be coupled to transmitter 136 in one embodiment and provide an indication of whether the seatbelt associated with a seating area of backseat 106 is fastened or not. Other components of system 101 in FIG. 8 are similar to as described above with reference to FIG. 5.

In other embodiments, system 101 can comprise additional electrodes and/or electrode pairs to provide even more occupancy data regarding a front seat, backseat, or both. Such a system can comprise a front seat transmitter and receiver electrode pair, as well as backseat transmitter electrodes adapted to pair with the front seat receiver electrode. In further embodiments, the front seat can comprise additional electrodes. For example, in one embodiment, a front seat comprises a plurality of transmit and receive electrodes arranged in the seat such that they are adapted to provide more detailed data and information about a seat occupant. Additional transmitter electrodes can be mounted in an upper or lower backrest portion, a headrest portion, and/or an armrest portion of a seat. Further, a horizontal placement of one or more electrodes can also vary, such as two electrodes disposed at even height but on either side of a backrest portion of a front seat. Additional receiver electrodes can also be disposed in the seat. In yet another embodiment, one or more additional receiver electrodes can be disposed in a front seat upper or lower backrest portion and/or a headrest portion to receive data from backseat transmitter electrodes. Such a receiver electrode configuration, in addition to the configurations described herein above, could provide even more information regarding an occupancy status of the backseat while at the same time providing additional information about a front seat occupancy status. Such electrodes could be shielded towards a front or backseat side, depending on a particular system configuration, by a ground plane in one embodiment.

Figure 9:
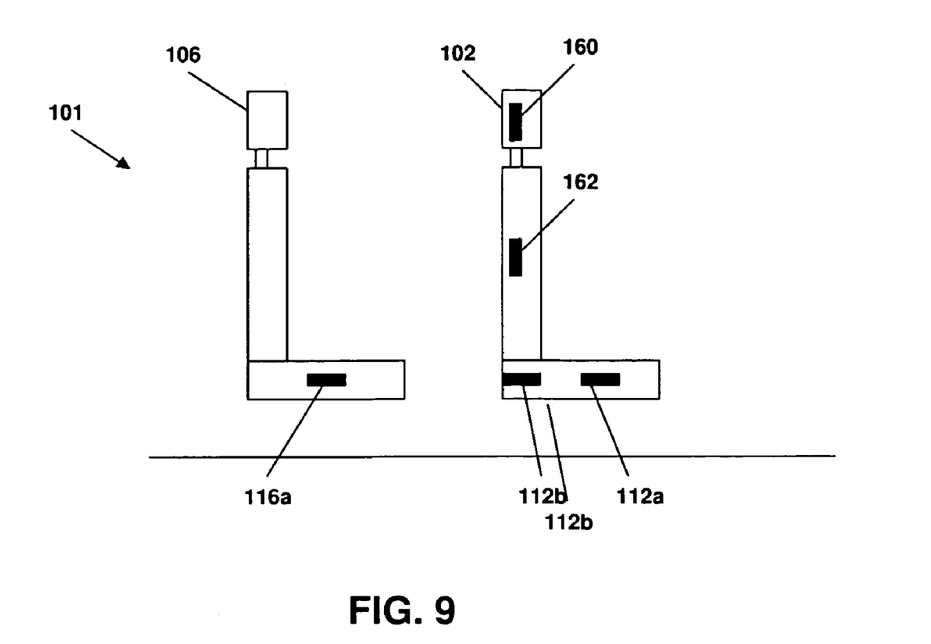
FIG. 9 is a diagram of a seating arrangement according to an embodiment.
Figure 10A:
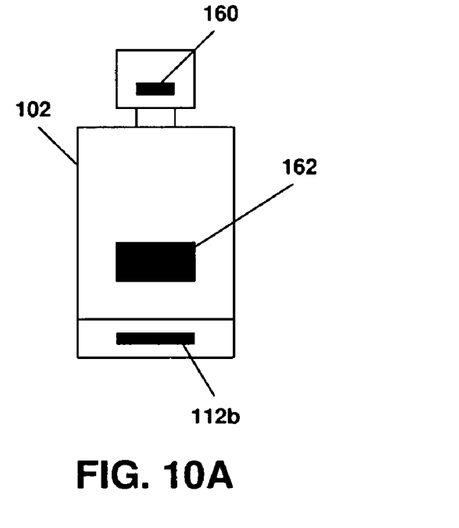
FIG. 10A is a back view of a seat according to an embodiment.
Figure 10B:
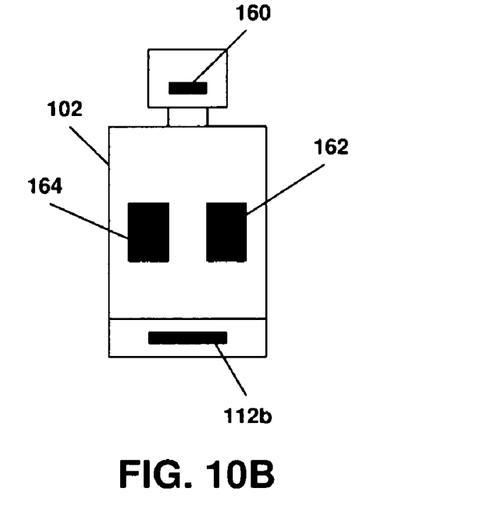
FIG. 10B is a back view of a seat according to an embodiment.

In FIG. 9, for example, system 101 comprises two additional electrodes 160 and 162, which can comprise either transmit or receive electrodes. System 101 can also omit, in other embodiments, either electrode 160 or electrode 162. The placement and disposition of either or both of electrodes 160 and 162 can also vary in other embodiments. For example, in FIG. 10A, electrode 160 is disposed in a headrest portion of seat 102, while electrode 162 is disposed in a backrest portion of seat 102. In FIG. 10B, two electrodes 162 and 164 are disposed in a backrest portion of seat 102. Electrodes 160, 162 and 164 can be transmitter electrodes, receiver electrodes, or a combination thereof.

Various embodiments of system 101 can thereby provide a relatively simple and cost-effective occupant detection system. Implementing more complex, dual electrode front seat occupant detection systems in vehicle backseats is often overly complex and cost prohibitive. Therefore, various embodiments of system 101 can comprise a backseat occupant detection system as add-on or extension to a more complex and/or existing front seat occupant detection system. Various other embodiments can comprise integrated front seat and backseat occupant detection systems for added versatility.

Although specific embodiments have been illustrated and described herein for purposes of description of an example embodiment, it will be appreciated by those of ordinary skill in the art that a wide variety of alternate and/or equivalent implementations calculated to achieve the same purposes may be substituted for the specific embodiments shown and described without departing from the scope of the present invention. Those skilled in the art will readily appreciate that the invention may be implemented in a very wide variety of embodiments. This application is intended to cover any adaptations or variations of the various embodiments discussed herein, including the disclosure information in the attached appendices. Therefore, it is manifestly intended that this invention be limited only by the claims and the equivalents thereof.

The invention claimed is:

1. A capacitive detection system comprising:
   a first transmitter electrode and a first receiver electrode disposed in a first seat and configured to form a first capacitor;
   a second transmitter electrode disposed in a second seat and configured with the first receiver electrode to form a second capacitor;
   a third transmitter electrode and a second receiver electrode disposed in a third seat and configured to form a third capacitor;
   a fourth transmitter electrode disposed in the second seat and configured with the second receiver electrode to form a fourth capacitor; and
   a fifth transmitter electrode disposed in the second seat and configured with the first receiver electrode to form a fifth capacitor and with the second receiver electrode to form a sixth capacitor.

2. The system of claim 1, further comprising a transmitter coupled to the second, fourth and fifth electrodes.

3. The system of claim 2, further comprising at least one buckle switch associated with the second seat and coupled to the transmitter.

4. The system of claim 1, further comprising:
   a first receiver unit coupled to the first receiver electrode; and
   a second receiver unit coupled to the second receiver electrode.

5. The system of claim 4, further comprising an electronics control unit (ECU) coupled to the first and second receiver units.

6. The system of claim 5, wherein the ECU is coupled to the first and second receiver units by a bus.

7. The system of claim 5, wherein the ECU is adapted to determine a seat occupancy status of the first, second and third seats from data received from the first and second receiver units.

8. The system of claim 1, wherein a capacitance of the first capacitor varies according to an occupancy status of the first seat and a capacitance of the second capacitor varies according to an occupancy status of the second seat.

9. The system of claim 1, further comprising a first test electrode disposed in the second seat, wherein the first test electrode is arranged closer to the first receiver electrode than the second transmitter electrode is.

10. The system of claim 1, further comprising at least one additional electrode disposed in the first seat.

11. A vehicle seat occupancy detection system comprising:
    a first transmitter electrode capacitively coupled to a first receiver electrode, the first transmitter electrode and the first receiver electrode arranged in a first vehicle front seat;
    a second transmitter electrode capacitively coupled to a second receiver electrode, the second transmitter electrode and the second receiver electrode arranged in a second vehicle front seat;
    a third transmitter electrode capacitively coupled to the first receiver electrode and arranged in a vehicle backseat;
    a fourth transmitter electrode capacitively coupled to the second receiver electrode and arranged in the vehicle backseat; and
    a fifth transmitter electrode capacitively coupled to the first and second receiver electrodes and arranged in the vehicle backseat.

12. The system of claim 11, further comprising an electronics control unit (ECU) coupled to the first and second receiver electrodes and adapted to determine a seat occupancy status of the first and second vehicle front seats and the vehicle backseat based at least in part on a capacitive coupling pattern.

13. The system of claim 12, further comprising: at least one test electrode arranged in the vehicle backseat and capacitively coupled to one of the first or second receiver electrodes.

14. The system of claim 11, further comprising a backseat transmitter coupled to the third, fourth and fifth transmitter electrodes.

15. The system of claim 14, wherein the backseat transmitter uses a transmission technique selected from the group consisting of time division multiple access (TDMA), frequency division multiple access (FDMA), and code division multiple access (CDMA).

16. The system of claim 14, further comprising at least one seatbelt buckle switch associated with the vehicle backseat and coupled to the backseat transmitter.

17. The system of claim 11, further comprising at least one additional electrode disposed in at least one of the first or second vehicle front seats.

18. A method of determining an occupancy status comprising:
    sensing a first capacitance between a first electrode in a first seat and a second electrode in a second seat;
    determining an occupancy status of at least a portion of the second seat based on the first capacitance;
    sensing a second capacitance between a third electrode in a third seat and a fourth electrode in the second seat;
    determining an occupancy status of at least a portion of the second seat based on the second capacitance;
    sensing a third capacitance between a fifth electrode in the second seat and the first electrode;
    sensing a fourth capacitance between the fifth electrode and the third electrode; and
    determining an occupancy status of at least a portion of the second seat based on the third and fourth capacitances.

19. The method of claim 18, further comprising transmitting to the second, fourth and fifth electrodes using a transmission technique selected from the group consisting of time division multiple access (TDMA), frequency division multiple access (FDMA), and code division multiple access (CDMA).

* * * * *